United States Patent [19]

Kohama et al.

[11] 4,242,997
[45] Jan. 6, 1981

[54] EXHAUST GAS RECIRCULATION SYSTEM FOR INTERNAL COMBUSTION ENGINES

[75] Inventors: Tokio Kohama, Nishio; Takeshi Matsui; Akira Nishimatsu, both of Aichi; Tokuta Inoue, Mishima; Kiyohiko Oishi, Susono; Kiyoshi Kobashi, Mishima, all of Japan

[73] Assignees: Nippon Soken, Inc., Nishio; Toyota Jidosha Kogyo Kabushiki Kaisha, Toyota, both of Japan

[21] Appl. No.: 62,556

[22] Filed: Jul. 31, 1979

[30] Foreign Application Priority Data

Aug. 2, 1978 [JP] Japan .................. 53-94418

[51] Int. Cl.³ ............................................. F02M 25/06
[52] U.S. Cl. ..................................................... 123/568
[58] Field of Search ............................. 123/119 A

[56] References Cited
U.S. PATENT DOCUMENTS

| 4,142,495 | 3/1979 | Lahiff | 123/119 A |
| 4,163,435 | 8/1979 | Nakajima | 123/119 A |
| 4,164,206 | 8/1979 | Tuelle | 123/119 A |
| 4,173,205 | 11/1979 | Tuelle | 123/119 A |
| 4,177,777 | 12/1979 | Maroyama et al. | 123/119 A |
| 4,195,531 | 4/1980 | Okamura | 123/119 A |

Primary Examiner—Wendell E. Burns
Attorney, Agent, or Firm—Cushman, Darby & Cushman

[57] ABSTRACT

In an exhaust gas recirculation system for an internal combustion engine, a flow control valve is disposed within a recirculation pipe and operatively connected to a pneumatically operated servomotor to control the flow quantity of exhaust gases through the recirculation pipe, and an orifice is disposed within the recirculation pipe upstream of the valve to form a space between the valve and the orifice. A pressure regulator serves to modulate negative pressure from an engine intake manifold to the servomotor on a basis of pneumatic pressure applied thereto and pressure in the space. The pneumatic pressure applied to the pressure regulator is electrically controlled to satisfy the following equation.

$$Pd = f(Pv, N)$$

where the character $Pd$ is the pneumatic pressure applied to the pressure regulator, and the characters $Pv$ and $N$ respectively indicate the negative pressure in the intake manifold and the engine speed.

5 Claims, 15 Drawing Figures

EXHAUST GAS RECIRCULATION SYSTEM FOR INTERNAL COMBUSTION ENGINES

BACKGROUND OF THE INVENTION

The present invention relates to an exhaust gas recirculation system for an internal combustion engine of an automotive vehicle, and more particularly to an exhaust gas recirculation system in which the flow quantity of exhaust gases into an induction passage is controlled in accordance with operating conditions of the engine to reduce the nitrogen oxide content of exhaust emissions (hereinafter called as $NO_x$ emissions).

In such a conventional exhaust gas recirculation system, the flow quantity of exhaust gases has been controlled in accordance with changes of negative pressure in the induction passage and exhaust pressure in the recirculation pipe. However, it has been experienced that the flow quantity of exhaust gases may not be appropriately controlled to ensure good driveability of the vehicle and to avoid unnecessary fuel consumption.

SUMMARY OF THE INVENTION

To solve the above-noted disadvantages, an exhaust gas recirculation system has been proposed by the inventors which comprises a pneumatically operated servomotor to be operated by negative pressure applied from an air induction passage, a flow control valve associated with the servomotor to control the flow quantity of exhaust gases through a recirculation pipe in response to operation of the servomotor, throttle means disposed within the recirculation pipe upstream of the flow control valve to form a space between the control valve and the throttle means, and pressure responsive means to control the negative pressure in the servomotor in response to pneumatic pressure applied thereto and the pressure in the space. In an experimentation conducted by the inventors, pneumatic pressure of various values has applied to the pressure responsive means to control operation of the servomotor so as to realize the proper control of exhaust gases through the recirculation pipe.

As a result of the experimentation, it has been observed that if the pneumatic pressure applied to the pressure responsive means is controlled to satisfy the following equation (1), the flow quantity of exhaust gases through the recirculation pipe is controlled to satisfy the following equation (2) in relation to the pressure appearing in the space.

$$Pd = f(Pv, N) \tag{1}$$

where the character Pd indicates the pneumatic pressure applied to the pressure responsive means, and the characters Pv, N respectively indicate negative pressure in the induction passage and rotational speed of the engine.

$$Q = CA\sqrt{Pe - Ps} \tag{2}$$

where the character Q indicates the flow quantity of exhaust gases through the recirculation pipe, where the characters A and C respectively indicate an opening degree of the throttle means and a coefficient of the flow quantity of the recirculated exhaust gases, and where the characters Pe and Ps respectively indicate exhaust pressure in an exhaust passage and the pressure in the space. In this condition, the pressure in the space will approach the controlled pneumatic pressure. This means that if the pneumatic pressure applied to the pressure responsive means is controlled to be substantially equal to the pressure in the space, the proper control of exhaust gases can be realized to ensure good driveability of the vehicle without unnecessary fuel consumption.

It has been also recognized that the above-noted function (1) will be experimentally obtained as a plurality of characteristic curves in relation to various types of engines. Prior to calculation of the pneumatic pressure Pd, for example, a plurality of values $f(l\Delta Pv, m\Delta N)$ may be obtained in the form of a map by division of the above-noted characteristic curves into a plurality of sections defined by predetermined values $l\Delta P$, $m\Delta N$ (l, m = 1, 2 ..., $\Delta P = 25$ mmHg, $\Delta N = 200$ r.p.m.). To calculate the pneumatic pressure Pd, the following inequalities and equations may be utilized in relation to respective values Pv, N, $\Delta Pv$, $\Delta N$, the integers l, m, and the above-noted map.

$$l\Delta Pv \leq Pv < (l+1)\Delta Pv \tag{3}$$

$$m\Delta N \leq N < (m+1)\Delta N \tag{4}$$

$$Pd_1 = \frac{\{(l+1)\Delta Pv - Pv\} f(l\Delta Pv, m\Delta N)}{\Delta Pv} + \frac{(Pv - l\Delta Pv) f\{(l+1)\Delta Pv, m\Delta N\}}{\Delta Pv} \tag{5}$$

$$Pd_2 = \frac{\{(l+1)\Delta Pv - Pv\} f\{l\Delta Pv, (m+1)\Delta N\}}{\Delta Pv} + \frac{(Pv - l\Delta Pv) f\{(l+1)\Delta Pv, (m+1)\Delta N\}}{\Delta Pv} \tag{6}$$

$$Pd = \frac{\{(m+1)\Delta N - N\} Pd_1 + (N - m\Delta N) Pd_2}{\Delta N} \tag{7}$$

It is, therefore, a primary object of the present invention to provide an exhaust gas recirculation system in which the above-noted function is effectively utilized to ensure optimum flow quantity of exhaust gases through the recirculation pipe in accordance with operating conditions of the engine.

According to the present invention, there is provided an exhaust gas recirculation system for an internal combustion engine having an induction passage for conducting air-fuel mixture into a combustion chamber of the engine, an exhaust passage for discharging exhaust gases from the combustion chamber, and a recirculation passage leading the exhaust passage to the induction passage to recirculate exhaust gases into the combustion chamber of the engine therethrough, the system comprising:

a pneumatically operated servomotor to be operated by negative pressure applied thereto from the induction passage;

flow control means disposed within the recirculation passage and associated with the servomotor for controlling the flow quantity of exhaust gases through the recirculation passage in accordance with changes of the negative pressure applied to the servomotor;

throttle means disposed within the recirculation passage upstream of the flow control means to form a space between the flow control means and the throttle means;

pressure responsive means for modulating negative pressure applied to the servomotor in response to pneumatic pressure applied thereto and pressure appearing in the space;

first means for producing a first electric binary signal indicative of rotational speed of the engine;

second means for producing a second electric binary signal indicative of negative pressure in the induction passage;

third means for producing a first electric analog signal indicative for pneumatic pressure applied to the pressure responsive means;

a digital computer for repetitively calculating a value indicative of optimum pneumatic pressure to be applied to the pressure responsive means in accordance with the first and second binary signals, the computer being programmed to calculate the optimum value from a function describing a desired relationship among optimum pneumatic pressure, rotational speed of the engine and negative pressure in the induction passage;

fourth means for converting a third electric binary signal indicative of the calculated optimum value from the computer into a second electric analog signal;

fifth means for comparing a level of the first analog signal with first and second levels derived from the second analog signal to produce a first output signal therefrom when the first level is higher than the level of the first analog signal and to produce a second output signal therefrom when the second level is lower than the level of the first analog signal, the fifth means ceasing the output signals when the level of the first analog signal is between the first and second levels; and first and second electrically operated valves to selectively apply negative pressure and the atmospheric pressure respectively from the induction passage and the exterior to the pressure responsive means when energized in response to one of the first and second output signals from the fifth means.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
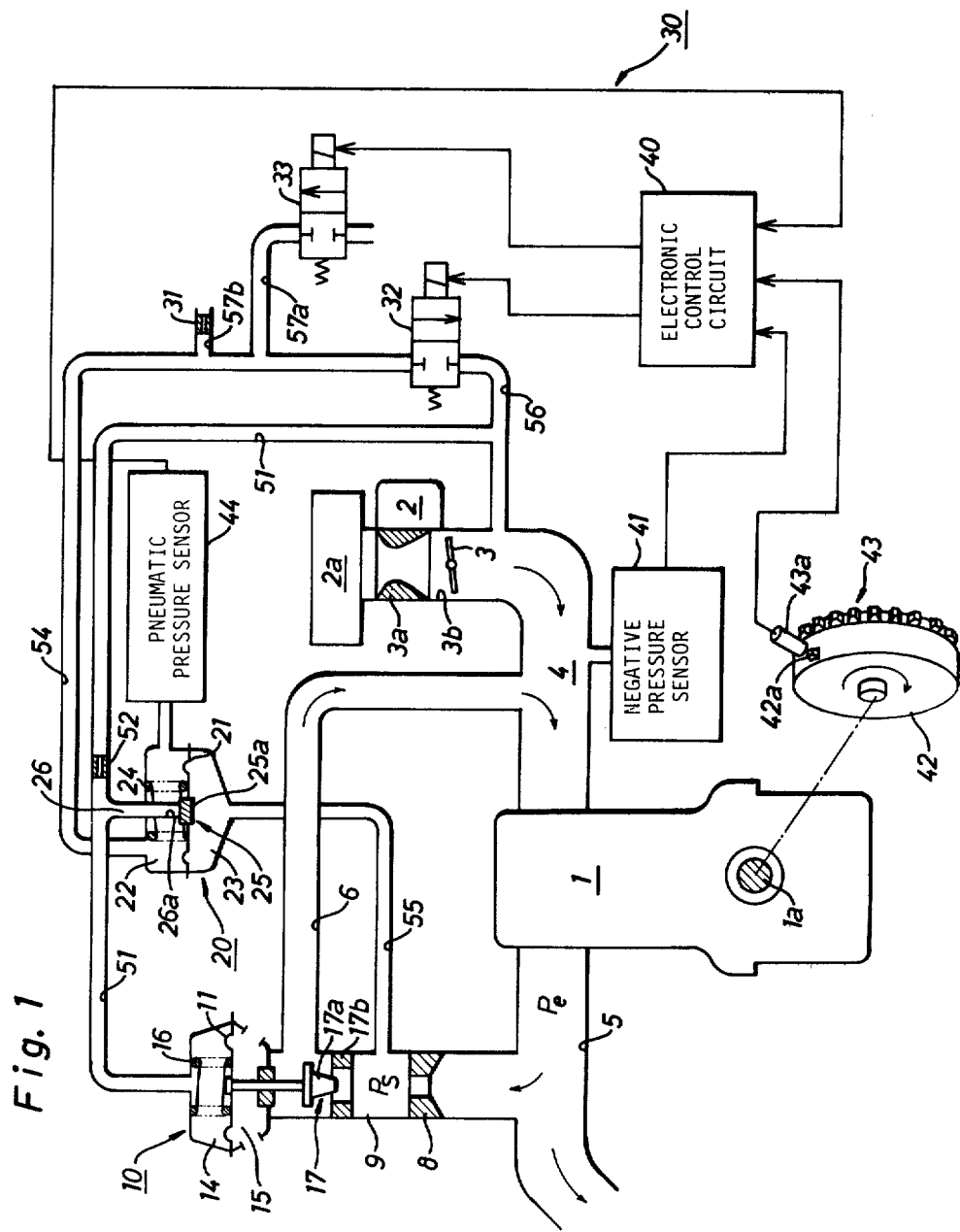
FIG. 1 is a schematic block diagram of an exhaust gas recirculation system for an internal combustion engine in accordance with the present invention.

Referring now to FIG. 1 of the drawings, there is schematically illustrated an exhaust gas recirculation system (hereinafter called as EGR system) for an internal combustion engine 1 in accordance with the present invention. The engine 1 is a conventional four cylinder, four stroke type and comprises intake and exhaust manifolds 4, 5. A carburetor 2 for engine 1 is also a conventional type and serves to receive fresh air from an air filter 2a at upstream end of a barrel 3b. The fresh air is drawn into the barrel 3b and mixed with fuel at a venturi 3a. The air-fuel mixture is then sucked into a combustion chamber of engine 1 through a throttle valve 3 and the intake manifold 4 and is discharged into the exhaust manifold 5 as exhaust gases. This exhaust gases produce exhaust pressure Pe in the exhaust manifold 5. In addition, an amount of the exhaust gases is approximately proportional to that of air drawn into the barrel 3b.

The EGR system comprises a recirculation pipe 6 which leads the exhaust manifold 5 to intake manifold 4 to recirculate the exhaust gases therethrough. The EGR system also comprises a fixed orifice 8 and a servomotor 10 which are respectively disposed within recirculation pipe 6. The servomotor 10 comprises a flexible diaphragm 11 assembled within a housing to subdivide the interior of the housing into air and servo chambers 15, 14. The air chamber 15 is opened into the atmosphere, and the servo chamber 14 is connected to the intake manifold 4 through a conduit 51. An orifice 52 is provided within the conduit 51 between a pressure regulator 20 and the intake manifold 4. A compression spring 16 is disposed within the servo chamber 14 to bias the diaphragm 11 toward the air chamber 15. The servomotor 10 also includes a control valve 17 which is provided within the recirculation pipe 6. The control valve 17 has a valve body 17a which is cooperable with a valve seat 17a to control the flow quantity of exhaust gases flowing through the valve seat 17b in accordance with difference between negative pressure in servo chamber 14 and biasing force of spring 16. The valve seat 17b is secured to an inner wall portion of pipe 6, and the valve body 17a is coupled to the diaphragm 11 through the air chamber 15. With the servomotor 10, an opening degree of control valve 17 increases in accordance with increase of negative pressure in the servo chamber 14.

The fixed orifice 8 has a predetermined opening degree and is located upstream of control valve 17 to form a space 9 within the recirculation pipe 6. Thus, the orifice 8 is cooperable with the control valve 9 to control the flow quantity of exhaust gases therethrough so as to produce exhaust pressure Ps in the space 9. The pressure regulator 20 comprises a flexible diaphragm 21 assembled within a housing to subdivide the interior of the housing into pneumatic and exhaust chambers 22, 23. The exhaust chamber 23 is connected through a conduit 55 to the space 9 of pipe 6 to receive therein the exhaust pressure Ps from the space 9. A compression spring 24 is disposed within the pneumatic chamber 22 to bias the diaphragm 21 toward the exhaust chamber 23. In this embodiment, biasing force of spring 24 is predetermined in a small value. The pressure regulator 20 also comprises a regulator valve 25 which is provided within the pneumatic chamber 22. The regulator valve 25 has a valve body 25a cooperable with an open end 26a of a branch conduit 26. The branch conduit 26 is connected at its base end to a portion of the conduit 51 between the servo chamber 14 of servomotor 10 and the orifice 52. The valve body 25a is secured to a central portion of diaphragm 21. When the exhaust pressure Ps in the space 9 is lower than the pneumatic pressure in the pneumatic chamber 22, the regulator valve 25 is opened to reduce negative pressure in the conduit 51. When the exhaust pressure Ps becomes higher than the pneumatic pressure, the regulator valve 25 is closed to restrict the reduction of negative pressure in the conduit 51.

The EGR system further comprises a pneumatic pressure control mechanism 30 in which an electronic control circuit 40 is provided to control operation of first and second electrically operated valves 32, 33 in response to electric signals from a negative pressure sensor 41, a rotational speed sensor 43 and a pneumatic pressure sensor 44. The first electrically operated valve 32 is a normally closed type and connected at its inlet port to the pneumatic chamber 22 of regulator 20 through a conduit 54. The valve 32 is also connected at its outlet port to the intake manifold 4 through a conduit 56. When the control circuit 40 produces a first output signal therefrom, as described below in detail, the electrically operated valve 32 is opened to communicate the pneumatic chamber 22 with the intake manifold 4 through conduits 54, 56. The second electrically operated valve 33 is also a normally closed type and is disposed within a branch conduit 57a. The branch conduit 57a is opened at its open end into the atmosphere and is connected at its base end to the pneumatic chamber 22 through a portion of the conduit 54. When the control circuit 40 produces a second output signal therefrom, as described below in detail, the electrically operated valve 33 is opened to communicate the pneumatic chamber 22 of regulator 20 with the atmosphere through conduits 54, 57a.

In the pressure control mechanism 30, an orifice 31 is disposed within another branch conduit 57b of which both ends are respectively opened into the atmosphere and a portion of the conduit 54. Thus, the atmospheric air is continuously throttled and applied by orifice 31 to the pneumatic chamber 22 of pressure regulator 20 through the conduits 57b, 54 regardlessly of operation of electrically operated valves 32, 33.

Figure 6:
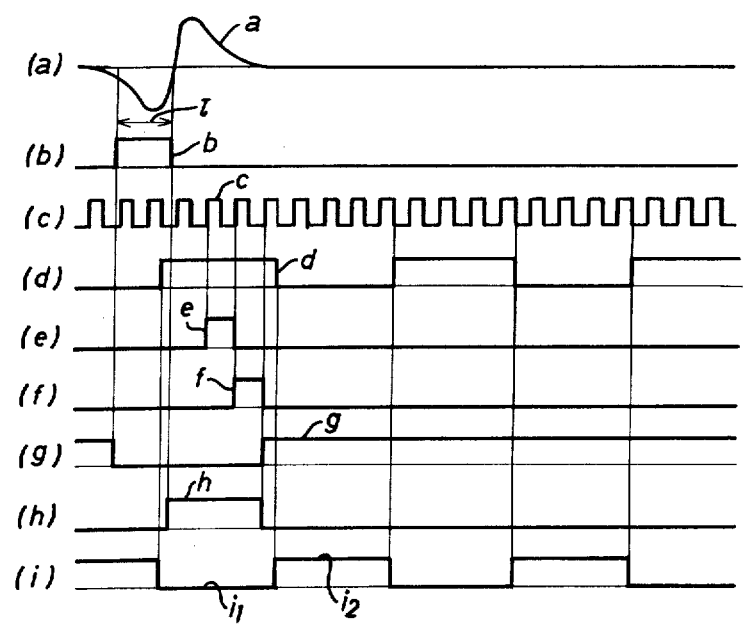
FIG. 6 illustrates waveforms obtained at various points in the circuit diagrams of FIGS. 2, 3.

The negative pressure sensor 41 is provided on the intake manifold 4 to detect negative pressure Pv in the intake manifold 4, the sensor 41 producing therefrom an electric signal indicative of the negative pressure Pv. The speed sensor 43 includes a magnetic pickup transducer 43a which is located in magnetic coupling relationship with a projection 42a of a ring gear 42. The ring gear 42 is operatively connected to a crankshaft 1a of engine 1 to rotate once at one crankshaft rotation. When the crankshaft 1a rotates, the transducer 43a detects the angular position of the projection 42a at each rotation of ring gear 42 to produce therefrom an electric signal a indictive of rotational speed N of engine 1 (see FIG. 6). The pneumatic pressure sensor 44 is provided on the pneumatic chamber 22 of regulator 20 to detect pneumatic pressure in the pneumatic chamber 22, the sensor 44 producing an electric analog signal with a level $V_p$ corresponding to a reciprocal of an absolute value of the pneumatic pressure.

Figure 2:
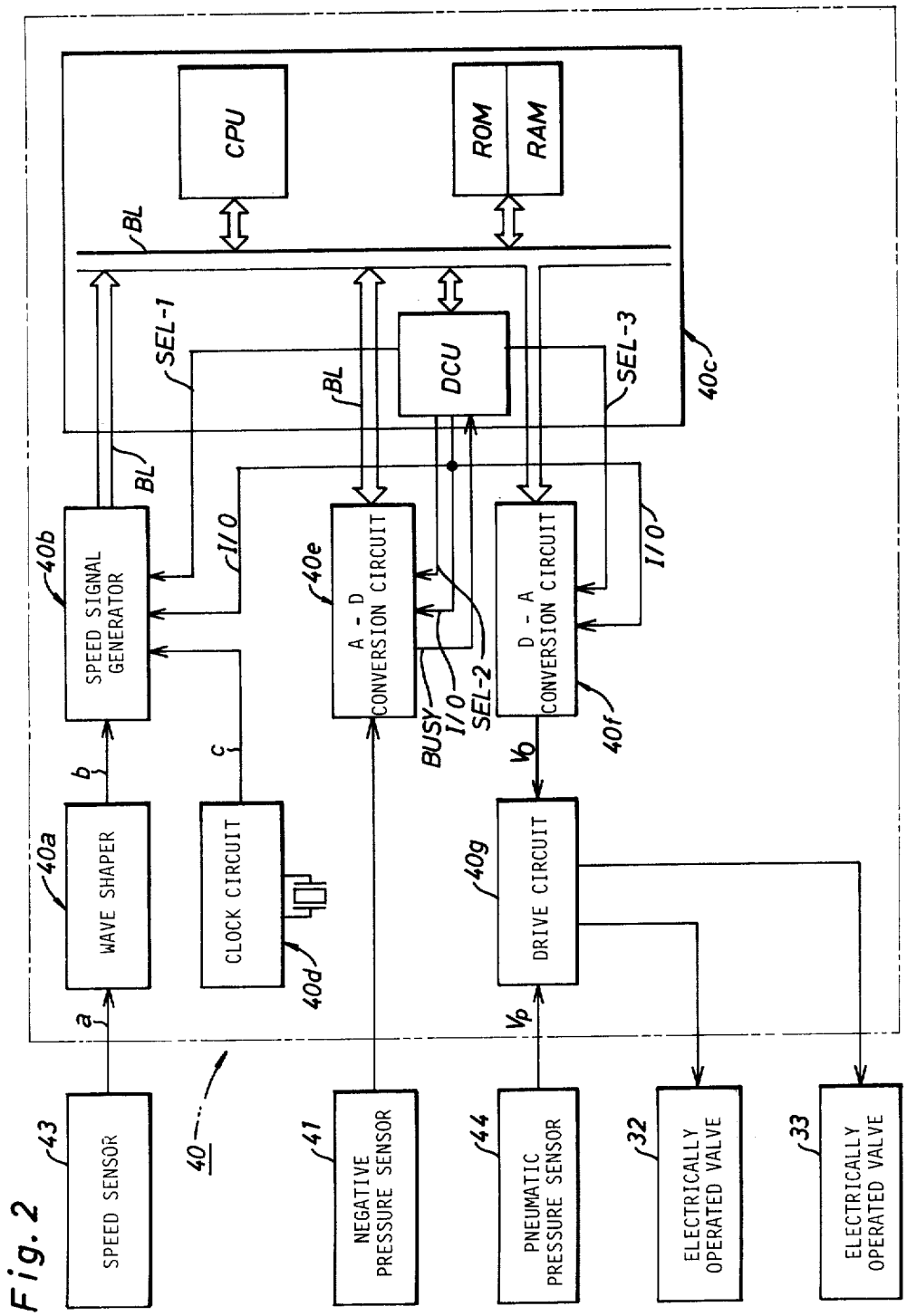
FIG. 2 is a circuit diagram of the electronic control circuit shown in block form in FIG. 1.

FIG. 2 illustrates a block diagram of the electronic control circuit 40 which comprises a speed signal generator 40b driven by a wave shaper 40a and a clock circuit 40d. The wave shaper 40a reshapes the electric signal a from speed sensor 43 into a rectangular pulse signal b shown in FIG. 6. The pulse signal b has a pulse-width $\tau$ and a period of time T corresponding with rotational speed N of engine 1. The clock circuit 40d is cooperable with a conventional crystal oscillator to generate a series of clock pulses c (see FIG. 6) at a predetermined frequency (about 128 KHz). The speed signal generator 40b serves to calculate the period of time T of the pulse signal b in accordance with clock pulses c. Then, the calculated resultant value is latched in the signal generator 40b and applied as a binary signal through a bus line BL to a digital computer 40c in response to an input-output or I/O signal and a first device-select or SEL-1 signal from computer 40c, as described below in detail. In the electronic control circuit 40, an analog-to-digital conversion circuit 40e is provided to convert the electric signal from negative pressure sensor 41 into an electric binary signal in response to the I/O signal, a second device-select or SEL-2 signal and an instruction signal from computer 40c. The binary signal from conversion circuit 40e is applied through bus line BL to computer 40c when required by computer 40c.

Figure 8:
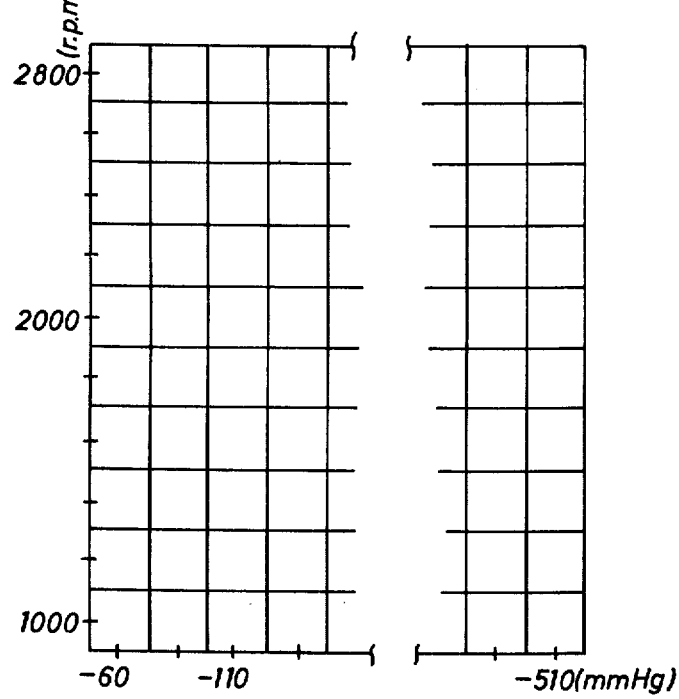
FIG. 8 is a map illustrating optimum pneumatic pressure in relation to rotational speed of the engine and negative pressure in the intake manifold.

The digital computer 40c comprises a central processing unit or CPU which is connected by way of bus line BL to a read only memory or ROM, a random access memory or RAM, and a device control unit or DCU. A predetermined program is previously stored in ROM such that CPU calculates an optimum value indicative of optimum pneumatic pressure Pd from the above-noted inequalities (3), (4) and equations (5), (6), (7). The above-noted data indicative of a plurality of the values f(lΔPv, mΔN) is experimentally obtained as the form of a map shown in FIG. 8 and previously stored in ROM. DCU serves to produce therefrom the I/O signal, SEL-1 and SEL-2 signals and a third device-select or SEL-3 signal when required by CPU. In accordance with proceeding of the program, the SEL-1 and I/O signals are applied to speed signal generator 40b, the SEL-2 and I/O signals are applied to the analog-to-digital conversion circuit 40e, and the SEL-3 and I/O signals are also applied to a digital-to-analog conversion circuit 40f.

RAM temporarily stores therein the binary signals from speed signal generator 40b and analog-to-digital conversion circuit 40e in response to the I/O, SEL-1 and SEL-2 signals. The value indicative of optimum pneumatic pressure Pd is calculated in CPU by means of the program by using the binary signals from RAM. The calculated optimum value is applied as a binary signal to the digital-to-analog conversion circuit 40f in response to the I/O and SEL-3 signals. In practice of the present invention, a microcomputer of TLCS-12A type manufactured by TOKYO SHIBAURA ELECTRIC CO., LTD. in Japan has been used as the computer 40c due to its commercial availability. Detail description regarding the microcomputer is eliminated because the particular construction and programming process is well known in prior arts.

The digital-to-analog conversion circuit 40f serves to convert the binary signal from computer 40c into an electric analog signal with a level $V_O$ in response to the I/O and SEL-3 signals from computer 40c, the level $V_O$ being indicative of the calculated optimum value of the binary signal from computer 40c. A drive circuit 40g is provided to selectively produce the above-noted first and second output signals in response to the analog signal from the pneumatic pressure sensor 44 and the analog signal from the conversion circuit 40f. The first and second output signals are respectively applied to the first and second electrically operated valves 32, 33.

Figure 3:
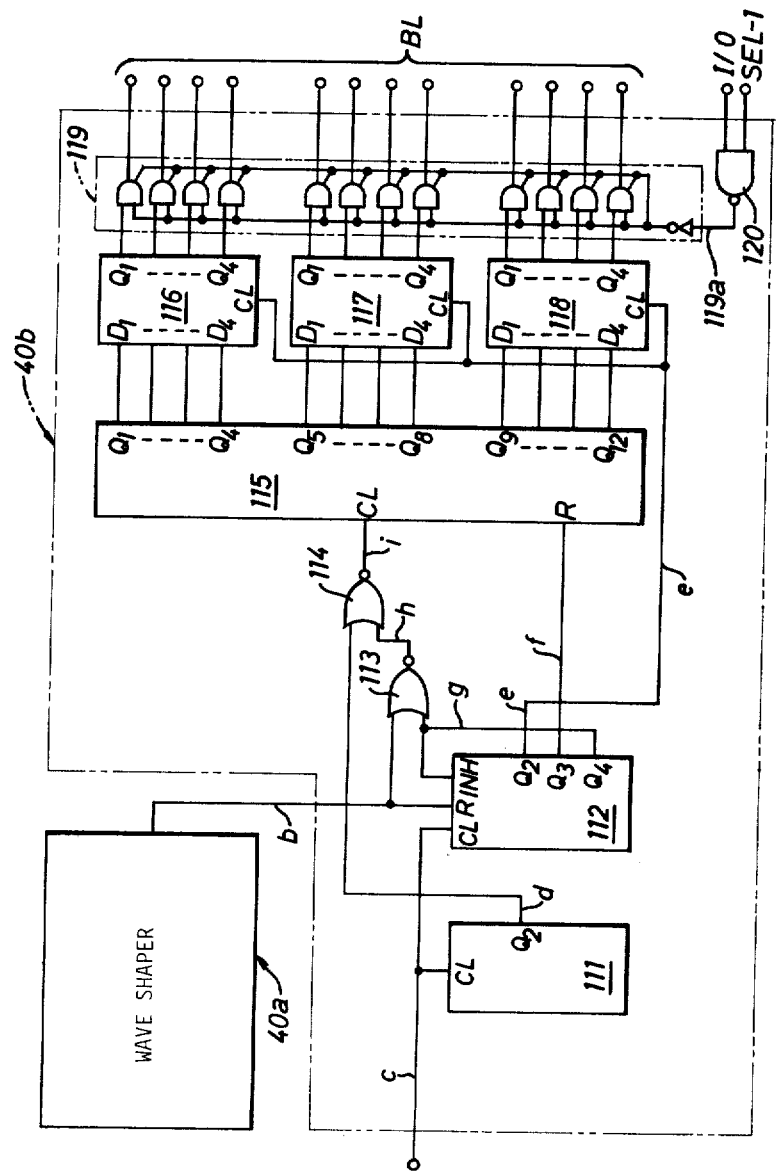
FIG. 3 is a circuit diagram of the speed signal generator shown in block form in FIG. 2.

In FIG. 3, there is illustrated a preferred embodiment of the speed signal generator 40b which comprises a binary counter 111 having a clock terminal CL for receiving clock pulses c from clock circuit 40d. The binary counter 111 is CD4024 type manufactured by RCA and serves to produce an electric signal d (see FIG. 6) at its output terminal $Q_2$ in accordance with clock pulses c, the electric signal d having a frequency of about 32 KHz. The electric signal d from counter 111 is applied to a NOR gate 114. The speed signal generator 40b also comprises a decade counter 112 which has a reset terminal R for receiving the pulse signal b from wave shaper 40a and a clock terminal CL for receiving clock pulses c from clock circuit 40d. When the decade counter 112 is reset in response to the pulse signal b, it starts to count clock pulses c at a trailing edge of the pulse signal b. Then, the counter 112 produces electric signals e, f, g at respective output terminals $Q_2$, $Q_3$, $Q_4$ in sequence. The electric signal e is applied to shift registers 116, 117, 118, the electric signal f is applied to a binary counter 115, and the electric signal g is applied to NOR gate 113. The electric signal g is also applied to an inhibit terminal INH of counter 112 to inhibit counting operation in counter 112.

NOR gate 113 has input terminals for respectively receiving the pulse signal b from wave shaper 40a and the electric signal g from counter 112. When the signals b, g are a low level respectively, NOR gate 113 produces a high level signal h (see FIG. 6) therefrom. When one of the signals b, g becomes a high level, the high level signal h becomes a low level. NOR gate 114 has input terminals for respectively receiving the electric signal d from counter 111 and the high level signal h from NOR gate 113. When the electric signal d is a high level, NOR gate 114 produces a low level signal $i_1$ therefrom (see FIG. 6). When the electric signal d becomes a low level, NOR gate 114 produces a high level signal $i_2$ therefrom. The low and high level signals $i_1$, $i_2$ are alternatively applied to a clock terminal CL of counter 115.

The binary counter 115 is reset in response to the electric signal f from counter 112 and starts to count a series of high level signal $i_2$ at a trailing edge of the electric signal f. The counting operation in counter 115 is completed at a trailing edge of an electric pulse signal b which will be produced from wave shaper 40a after generation of the above-noted signal f. In other words, the counting operation in counter 115 is started at the trailing edge of the above-noted signal f and thereafter completed at a leading edge of a high level signal h which will be produced from NOR gate 113 after generation of the above-noted signal f. As a result, the counter 115 produces respective output signals at its terminals $Q_1$ to $Q_{12}$ as an electric binary signal indicative of the period of time T of the pulse signal b, the period of time T being proportional to a reciprocal of rotational speed N of engine 1.

The shift registers 116, 117, 118 are respectively of CD 4035 type manufactured by RCA. The shift register 116 has a clock terminal CL for receiving the electric signal e from counter 112 and input terminals $D_1$ to $D_4$ for respectively receiving the output signals from the terminals $Q_1$ to $Q_4$ of counter 115. When the electric signal e appears from counter 112, the register 116 latches therein the output signals from counter 115. The remaning registers 117, 118 have substantially the same construction and function as those of register 116. Thus, all the output signals from counter 115 are simultaneously latched as the binary signal by the registers 116, 117, 118.

The speed signal generator 40b comprises a three-state-buffer 119 controlled by a NAND gate 120. NAND gate 120 has input terminals for respectively receiving the I/O and SEL-1 signals from computer 40c. When the I/O and SEL-1 signals are a high level respectively, NAND gate 120 produces a low level signal therefrom. When one of the I/O and SEL-1 signals becomes a low level, NAND gate 120 produces a high level signal therefrom. The three-state-buffer 119 has a control terminal 119a for receiving the low or high level signal from NAND gate 120 and input terminals for respectively receiving the output signals from registers 116, 117, 118. The three-state-buffer 119 transfers the output signals from registers 116, 117, 118 as the binary signal into computer 40c through bus line BL in response to the low level signal from NAND gate 120. When NAND gate 120 produces the high level signal, high impedance is formed at ouput terminals of three-state-buffer 119 to electrically disconnect the computer 40c from the registers 116, 117, 118.

Figure 4:
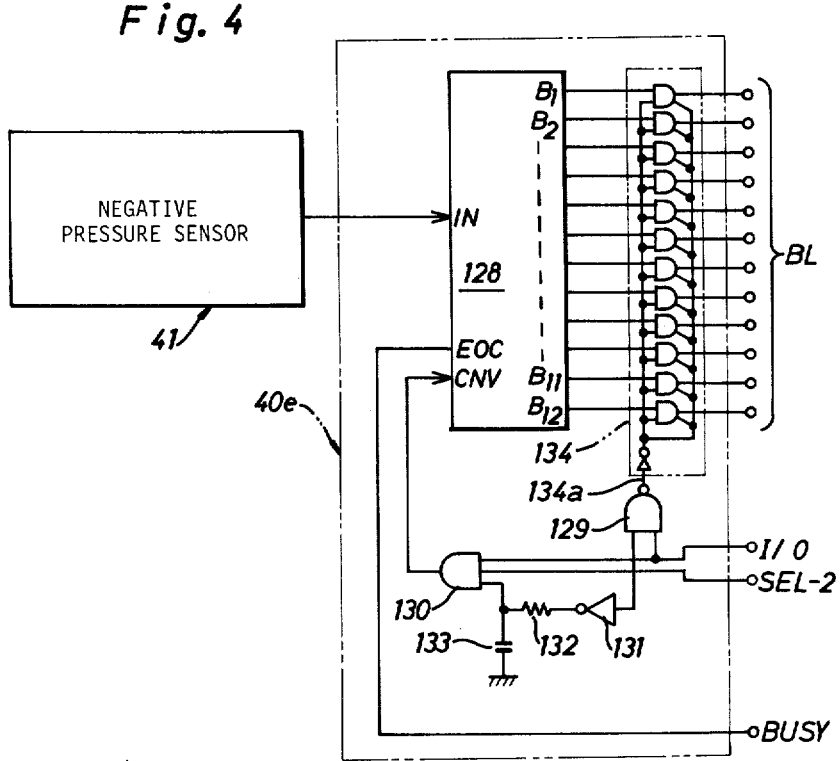
FIG. 4 is a circuit diagram of the analog-to-digital conversion circuit shown in block form in FIG. 2.
Figure 7:
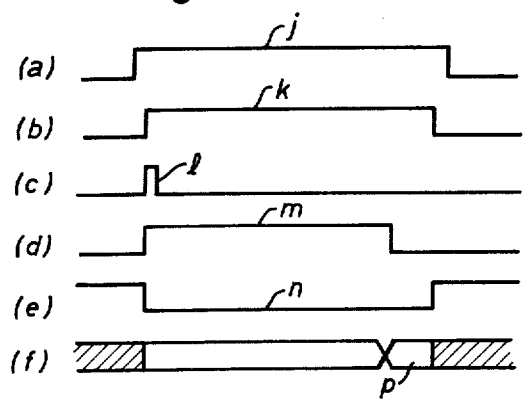
FIG. 7 illustrates waveforms obtained at various points in the circuit diagram of FIG. 4.

FIG. 4 illustrates a preferred embodiment of the analog-to-digital conversion circuit 40e which includes a successive approximation analog-to-digital converter 128 controlled by an AND gate 130 and a three-state-buffer 134 controlled by a NAND gate 129. NAND gate 129 has input terminals for respectively receiving the I/O and SEL-2 signals from computer 40c. When the I/O and SEL-2 signals are respectively high level signals j, k (see FIG. 7), NAND gate 129 produces therefrom a low level signal n (see FIG. 7). When one of the I/O and SEL-2 signals becomes a low level, the low level signal n from NAND gate 129 becomes a high level. AND gate 130 has first and second input terminals for respectively receiving the I/O and SEL-2 signals from computer 40c. AND gate 130 also has a third input terminal for receiving the SEL-2 signal through a delay circuit including an inverter 131, a resistor 132 and a condenser 113. When the I/O and SEL-2 signals are respectively the high level signals j, k, AND gate 130 produces therefrom an electric pulse signal l having a pulse-width of about 100 nanoseconds (see FIG. 7).

The analog-to-digital converter 128 is of ADC 80AG-12 type manufactured by Burr-brown Research Corporation in U.S.A. The converter 128 has an input terminal IN for receiving the electric signal from negative pressure sensor 41 and a convert-command input terminal CNV for receiving the pulse signal l from AND gate 130. The converter 128 also has an end-of-conversion output terminal EOC for applying an electric signal to computer 40c. When AND gate 130 produces the pulse signal l therefrom, the converter 128 initiates to convert the electric signal from sensor 41 into a binary signal at a leading edge of the pulse signal l. Simultaneously, the electric signal is produced from the output terminal EOC of converter 128 as a high level or busy signal m (see FIG. 7) and applied to DCU of computer 40c. In this instance, during generation of the busy signal m, the above-noted conversion in converter 128 is continued, and transfer of the binary signal from converter 128 to computer 40c through three-state-buffer 134 is conditioned in waiting. When the busy signal m becomes a low level, the above-noted conversion in converter 128 is ended, and the above-noted waiting condition of transfer of the binary signal from converter 128 is also released. Thus, the binary signal from converter 128 is transferred to computer 40c in accordance with the low level signal n from NAND gate 129 within a period of time shown by the character p in FIG. 7. When the high level signal k becomes a low level (see FIG. 7), high impedance is formed in three-state-buffer 134 in response to the high level signal from NAND gate 129 to electrically disconnect the computer 40c from the converter 128. In addition, the three-state-buffer 134 has the same construction and function as that in the speed signal generator 40b of FIG. 3.

Figure 5:
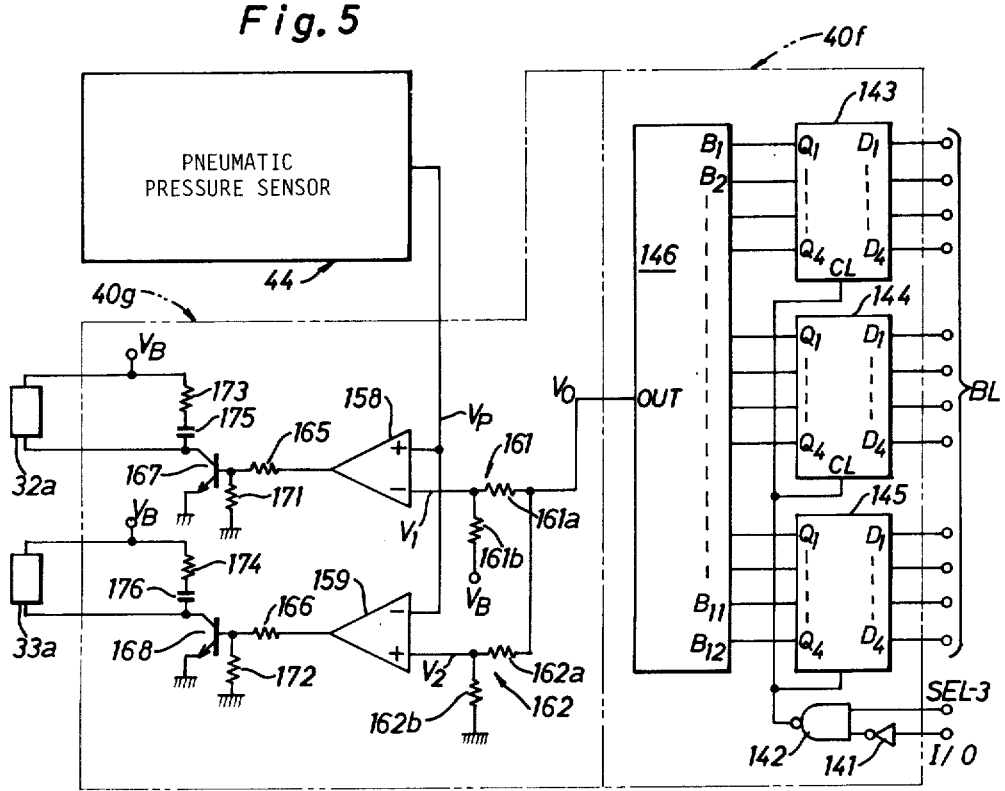
FIG. 5 is circuit diagrams of the digital-to-analog conversion circuit and the drive circuit respectively shown in block forms in FIG. 2.

FIG. 5 illustrates preferred embodiments of the digital-to-analog conversion circuit 40f and drive circuit 40g. The digital-to-analog conversion circuit 40f comprises shift registers 143, 144, 145 controlled by a NAND gate 142. NAND gate 142 has a first input terminal for receiving the SEL-3 signal from computer 40c and a second input terminal for receiving an inverted output signal from an inverter 141. The inverter 141 serves to invert the I/O signal from computer 40c into the inverted output signal. When the SEL-3 and inverted output signal are respectively a high level, NAND gate 142 produces a low level or latch signal therefrom. Each of shift registers 143, 144, 145 is the same as each of the registers 116, 117, 118 shown in FIG. 3 and is provided with a clock terminal CL for receiving the latch signal from NAND gate 142. The binary signal from computer 40c is latched by the registers 143, 144, 145 in response to the latch signal from NAND gate 142 and transferred to a digital-to-analog converter 146. The converter 146 is of DAC 80 type manufactured by Burr-brown Research Corporation and converts the latched binary signal from registers 143, 144, 145 into an electric analog signal with a level $V_O$ corresponding with the optimum calculated value defined by the binary signal from computer 40c.

The drive circuit 40g comprises a first voltage divider 161 having a pair of resistors 161a, 161b, and a second voltage divider 162 having a pair of resistors 162a, 162b. In the first voltage divider 161, the resistor 161b is connected at its one end to an electric source $V_B$ and connected at its other end to the output terminal of digital-to-analog converter 146 through the resistor 161a. The first voltage divider 161 receives the analog signal from converter 146 to produce a first divided voltage $V_1$ therefrom. In the second voltage divider 162, the resistor 162b is grounded at its one end and connected at its other end to the output terminal of converter 146 through the resistor 162a. The second voltage divider 162 receives the analog signal from converter 146 to produce a second divided voltage $V_2$ therefrom.

Describing relationship between the first and second divided voltages $V_1$, $V_2$, the divided voltages $V_1$, $V_2$ are respectively represented as the following equations (8), (9).

$$V_1 = \frac{R_2}{R_1+R_2} \cdot V_0 + \frac{R_1}{R_1+R_2} \cdot V_B \tag{8}$$

$$V_2 = \frac{R_4}{R_3+R_4} \cdot V_0 \tag{9}$$

where the characters $R_1$, $R_2$ indicate resistance values of the resistors 161a, 161b respectively, and where the characters $R_3$, $R_4$ indicate resistance values of the resistors 162a, 162b respectively. Assuming that the resistance values $R_1$, $R_2$ are respectively equal to the resistance values $R_3$, $R_4$ and that $R_1 V_B/(R_1+R_2)$ is represented as $\Delta V$, the relationship between the divided voltages $V_1$, $V_2$ is defined as the following equation (10).

$$V_2 = V_1 - \Delta V \tag{10}$$

Figure 9:
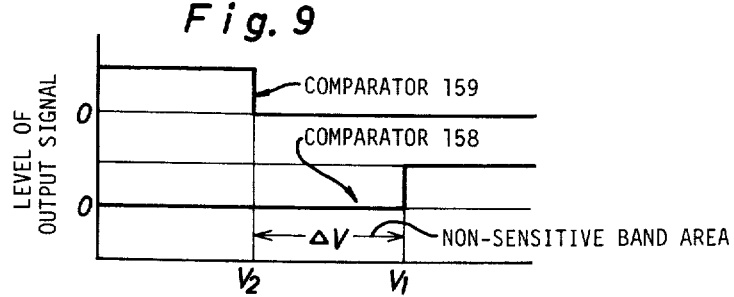
FIG. 9 is a graph indicating operational relationship between the drive circuit and the electrically operated valves.

This means that difference between the divided voltages $V_1$, $V_2$ is defined as $\Delta V$, as shown in FIG. 9.

The drive circuit 40g also comprises a first comparator 158 controlled by the pneumatic pressure sensor 44 and the first voltage divider 161. The first comparator 158 has a first input terminal for receiving the analog signal from pneumatic pressure sensor 44 and a second input terminal for receiving the divided voltage $V_1$ from first voltage divider 161. When the level $V_p$ of the analog signal from sensor 44 is higher than the divided voltage $V_1$ from divider 161, the comparator 158 produces a high level signal therefrom (see FIG. 9). When the level $V_p$ of the analog signal is lower than the divided voltage $V_1$, the comparator 158 produces a low level signal therefrom. The low or high level signal from comparator 158 is applied to a base of a power transistor 167 through input and bias resistors 165, 171. A second comparator 159 is provided to be controlled by the sensor 44 and the second voltage divider 162. The second comparator 159 has a first input terminal for receiving the analog signal from sensor 44 and a second input terminal for receiving the divided voltage $V_2$ from divider 162. When the level $V_p$ of the analog signal from sensor 44 is higher than the divided voltage $V_2$ from divider 162, the comparator 159 produces a low level signal therefrom (see FIG. 9). When the level $V_p$ of the analog signal is lower than the divided voltage $V_2$, the comparator 159 produces a high level signal therefrom. The low or high level signal from comparator 159 is applied to a base of a power transistor 168 through input and bias resistors 166, 172.

The power transistor 167 is connected at its collector to the electric source $V_B$ through an electromagnetic coil 32a of the valve 32, the coil 32 being connected in parallel to a resistor 173 and a condenser 175. When the transistor 167 is turned on in response to the high level signal from comparator 158, it produces the first output signal therefrom such that the coil 32a is energized to open the valve 32. The transistor 167 is also turned off in response to the low level signal from comparator 158 such that the coil 32a is deenergized to close the valve 32. Meanwhile, the power transistor 168 is connected at its collector to the electric source $V_B$ through an electromagnetic coil 33a of the valve 33, the coil 33a being connected in parallel to a resistor 174 and a condenser 176. When the transistor 168 is turned on in response to the high level signal from comparator 159, it produces the second output signal therefrom such that the coil 33a is energized to open the valve 33. The transistor 168 is also turned off in response to the low level signal from comparator 159 such that the coil 33a is deenergized to close the valve 33. In other words, the comparators 158, 159 produce the low level signals respectively while the level $V_p$ of the analog signal from sensor 44 is between the first and second divided voltages $V_1$, $V_2$, as previously described. Thus, the electromagnetic coils 32a, 33a are deenergized due to nonconduction of transistors 167, 168 to close the valves 32, 33 respectively. This means that the difference $\Delta V$ between the divided voltages $V_1$, $V_2$ provides a non-sensitive band area for the valves 32, 33 (see FIG. 9). In the embodiment, the difference ΔV corresponds with a predetermined pressure value P₀ of 10 mmHg.

OPERATION

Assuming that during rotation of engine 1, the pressure regulator 20 is maintained in operative condition defined by a first band area W (see FIG. 10), the flow of exhaust gases discharged into exhaust manifold 5 is led into the recirculation pipe 6 and throttled by the orifice 8 to produce exhaust pressure Ps in the space 9. The exhaust pressure Ps is applied into the exhaust chamber 23 of pressure regulator 20 through the conduit 55, whereas the throttled flow of exhaust gases is controlled by the servomotor 10, as described below, and is recirculated into the intake manifold 4. In addition, the exhaust pressure Ps in space 9 is lower than exhaust pressure Pe produced by the exhaust gases in exhaust manifold 5.

In the control mechanism 30, rotational speed N of engine 1 is detected and produced by the speed sensor 43 as an electric signal a indicative of the rotational speed N. Negative pressure Pv in intake manifold 4 is detected and produced by the negative pressure sensor 41 as an electric signal indicative of the negative pressure Pv, and pneumatic pressure in the pneumatic chamber 22 of pressure regulator 20 is also detected and produced by the pneumatic pressure sensor 44 as an electric analog signal with a level $V_p$ corresponding to a reciprocal of an absolute value of the pneumatic pressure. The electric signals from sensors 43, 41, 44 are respectively applied to wave shaper 40a, analog-to-digital conversion circuit 40e and drive circuit 40g.

The electric signal a is then reshaped by wave shaper 40a and applied to speed signal generator 40b as a rectangular pulse signal b together with clock pulses c from clock circuit 40d. In the speed signal generator 40b, clock pulses c are counted and produced by the binary counter 111 as an electric signal d which is applied to NOR gate 114. When the decade counter 112 is reset in response to the pulse signal b from wave shaper 40a, clock pulses c are counted and produced by counter 112 as electric signals e, f, q in sequence, as previously described. The electric signals e, f are respectively applied to the shift registers 116, 117, 118 and the binary counter 115, and the electric signal g is also applied to NOR gate 113 and counter 112.

Then, an electric binary signal indicative of a period of time T, which has been previously produced from counter 115, is latched by the shift registers 116, 117, 118 in response to the electric signal e from counter 112. When NAND gate 120 produces therefrom a low level signal, as previously described, the latched binary signal in registers 116, 117, 118 is transferred by the three-state-buffer 119 to computer 40c through bus line BL to be temporarily memorized in RAM. A series of high level signals i₂, which will be sequentially produced from NOR gate 114, are also counted by the binary counter 115 in response to the electric signal f from counter 112, counting operation of counter 112 being inhibited in response to the electric signal g.

When NAND gate 129 and AND gate 130 in the analog-to-digital conversion circuit 40e produce a high level signal and an electric pulse signal l respectively, as previously described, the successive approximation analog-to-digital converter 128 is electrically disconnected from computer 40c by the three-state-buffer 134 and initiates to convert the electric signal indicative of the negative pressure Pv from sensor 41 into a binary signal. Simultaneously, a high level signal m is produced and applied by the converter 128 to computer 40c as a busy signal. Then, transfer of the binary signal from converter 128 to computer 40c is conditioned in waiting. When the busy signal becomes a low level, the above-noted conversion in converter 128 is ended, and the above-noted waiting condition of computer 40c is released. The high level signal from NAND gate 129 also becomes a low level signal n, as previously described, which is applied to the three-state-buffer 134. Thus, the binary signal from converter 128 is transferred into the computer 40c by the three-state-buffer 134 to be temporarily memorized in RAM.

When the binary signals from the speed signal generator 40b and analog-to-digital conversion circuit 40e are memorized in RAM, as previously described, the binary signal indicative of the period of time T is firstly read out by CPU by means of the computer program. Then, a reciprocal of the period of time T is calculated in CPU and memorized temporarily in RAM as rotational speed N. In accordance with proceeding of the computer program, the binary signal indicative of the negative pressure Pv is read out from RAM together with the rotational speed N, and values of the integers l, m are respectively determined by CPU from the programmed inequalities (3), (4) in relation to the values N, Pv. Thereafter, respective values f(lΔPv, mΔN), f{(l+1)ΔPv, mΔN}, f{lΔPv, (m+1)ΔN}, f{(l+1)ΔPv, (m+1)ΔN} are read out from ROM by CPU in relation to the determined values of the integers l, m. Thus, a value indicative of optimum pneumatic pressure Pd is calculated in CPU by using the respective values Pv, N, l, m, ΔPv, ΔN from the programmed equations (5), (6), (7) and, in turn, transferred as a binary signal to the digital-to-analog conversion circuit 40f in response to the I/O and SEL-3 signals.

When NAND gate 142 in digital-to-analog conversion circuit 40f produces a latch signal therefrom, as previously described, the binary signal from computer 40c is transferred by the shift registers 143, 144, 145 into the digital-to-analog converter 146. Then, the binary signal is converted and applied by converter 146 to the drive circuit 40g as an electric analog signal with a level V₀. The analog signal from converter 146 is then divided and applied by the first voltage divider 161 to the first comparator 158 as a first divided voltage V₁ together with the above-mentioned analog signal from the pneumatic pressure sensor 44. The analog signal from converter 146 is also divided and applied by the second voltage divider 162 to the second comparator 159 as a second divided voltage V₂ together with the above-mentioned analog signal from sensor 44.

Figure 10:
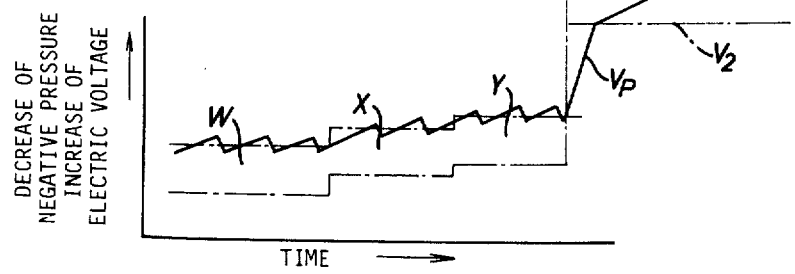
FIG. 10 is a graph showing negative pressure or electric voltage in relation to time.

At this stage, the level $V_p$ of the analog signal from sensor 44 is maintained to be slightly lower or higher than the divided voltage V₁ under throttle effect of the orifice 31, since the operative condition of pressure regulator 20 is maintained in the first band area W of FIG. 10, as previously described. Low and high level signals are, therefore, alternatively produced from the first comparator 158 and applied to transistor 167 so that the electromagnetic coil 32a is energized in response to intermittent conduction of transistor 167 to open the first electrically operated valve 32 intermittently. Since the level $V_p$ of the analog signal from sensor 44 is also maintained to be higher than the divided voltage V₂, as clearly understood from the above, a low level signal is produced from the second comparator 159 and applied to transistor 168 so that the electromagnetic coil 33a is deenergized due to nonconduction of transistor 168 to continuously close the second electrically operated valve 33. Thus, negative pressure is intermittently applied from the intake manifold 4 to the pneumatic chamber 22 of pressure regulator 20 through the conduit 56, electrically operated valve 32 and conduit 54, and the atmospheric pressure is also continuously throttled and applied by the orifice 31 to the pneumatic chamber 22 through the conduits 57b, 54. As a result, pneumatic pressure in the chamber 22 of pressure regulator 20 is substantially modulated in the optimum calculated value. In this instance, due to control by orifice 31, the pneumatic pressure in the pneumatic chamber 22 is well precisely modulated toward the optimum calculated value, and operational frequency of the electrically operated value 32 is decreased to hold life of the valve 32 as long as possible.

When the exhaust chamber 23 receives therein the exhaust pressure Ps from space 9 and the pneumatic pressure in the chamber 22 is modulated in the optimum value, as previously described, the regulator valve 25 is operated in accordance with difference between the exhaust pressure and modulated pneumatic pressure to modulate negative pressure through the conduit 51 in a value. Thus, the control valve 17 is substantially maintained in an opening degree so that the flow quantity of exhaust gases through recirculation pipe 6 is precisely controlled to ensure good driveability of a vehicle and proper fuel consumption. This means that the exhaust pressure Ps in the space 9 is controlled to be substantially equal to the modulated pneumatic pressure in the chamber 22.

Even if operative condition of the pressure regulator 20 is shifted from the first band area W to second and third band areas X, Y in sequence (see FIG. 10), it will be clearly understood that the same operation as the above-noted operation is substantially maintained in the areas X, Y, since each of divided voltages $V_1$ in the areas X, Y does not change beyond difference between divided voltages $V_1$, $V_2$.

When operative condition of the pressure regulator 20 is shifted from the third band area Y to a fourth band area Z in accordance with changes of engine rotation (see FIG. 10), changes of the engine rotation are detected and produced by speed sensor 43 as an electric signal a, and changes of negative pressure in intake manifold 4 are detected and produced by negative pressure sensor 41 as an electric signal. In this instance, the pneumatic pressure in the pneumatic chamber 22 of pressure regulator 20 is still held in a value defined by the third band area Y. When the electric signal a is reshaped by wave shaper 40a, it is applied to speed signal generator 40b as a rectangular pulse signal b together with clock pulses c from clock circuit 40d. Then, an electric binary signal is produced and applied by speed signal generator 40b to computer 40c to be temporarily memorized in RAM, as previously described. The electric signal from negative pressure sensor 41 is also converted and applied by analog-to-digital conversion circuit 40e to computer 40c as an electric binary signal to be temporarily memorized in RAM, as previously described. Then, a value indicative of optimum pneumatic pressure is calculated in computer 40c by means of the program in accordance with the binary signals from the speed signal generator 40b and analog-to-digital conversion circuit 40e and, in turn, transferred as a binary signal to the digital-to-analog conversion circuit 40f, as previously described. When the binary signal from computer 40c is converted by convertion circuit 40f into an electric analog signal, the analog signal is divided by the first and second voltage dividers 161, 162 respectively into divided voltages $V_1$, $V_2$.

When the first comparator 158 receives the divided voltage $V_1$ together with the analog signal from pneumatic pressure sensor 44, a low level signal is produced from first comparator 158, since the level $V_p$ of the analog signal (see the area Y of FIG. 10) is lower than the divided voltage $V_1$ shown by the area Z of FIG. 10. The low level signal from first comparator 158 is applied to transistor 167 so that the electromagnetic coil 32a is deenergized due to nonconduction of transistor 167 to close the first electrically operated valve 32. When the second comparator 159 receives the divided voltage $V_2$ together with the analog signal from sensor 44, a high level signal is produced from second comparator 159, since the level $V_p$ of the analog signal is lower than the divided voltage $V_2$. Then, the transistor 168 is turned on in response to the high level signal from comparator 159 so that the electromagnetic coil 33a is energized to open the second electrically operated valve 33. Subsequently, the atmospheric air is applied to the pneumatic chamber 22 of pressure regulator 20 through the valve 33 to modulate pneumatic pressure in the chamber 22. When the pneumatic pressure in the chamber 22 reaches a value corresponding with the divided voltage $V_2$ in the fourth area Z, the level $V_p$ of the analog signal from sensor 44 becomes the divided voltage $V_2$, and the second comparator 159 produces a low level signal to make the transistor 168 nonconductive. Thus, the electromagnetic coil 33a is deenergized to close the valve 33.

Thereafter, the atmospheric air is applied by the orifice 31 to the pneumatic chamber 22 under closure of the valves 32, 33 to gradually modulate pneumatic pressure in the chamber 22. When the pneumatic pressure in the chamber 22 reaches the optimum value calculated in the computer 40c, the level $V_p$ of the analog signal from sensor 44 becomes the divided voltage $V_1$, as shown in the area Z of FIG. 10. After this stage, the level $V_p$ of the analog signal from sensor 44 is maintained to be slightly lower or higher than the divided voltage $V_1$ under throttle effect of the orifice 31. As a result, the opening degree of control valve 17 is changed and maintained in accordance with difference between the modulated pneumatic pressure in chamber 22 and exhaust pressure in the chamber 23, as previously described. Thus, the flow quantity of exhaust gases recirculated through the recirculation pipe 6 are precisely controlled by cooperation of the control valve 17 and pressure regulator 20 to ensure good driveability of the vehicle and proper fuel consumption. This means that the exhaust pressure in the space 9 is controlled to become equal to the modulated pneumatic pressure in the chamber 22.

In the operation described above, if the band area Z corresponds with engine condition causing increase of $NO_x$ emissions, the pneumatic pressure in the chamber 22 is modulated in a smaller value by the computer 40c so that opening degree of control valve 17 is increased to increase the flow quantity of exhaust gases through the recirculation pipe 6. If the band area Z corresponds with engine condition causing decrease of $NO_x$ emissions, the pneumatic pressure in chamber 22 is modulated in a larger value by the computer 40c so that opening degree of control valve 17 is decreased to decrease the flow quantity of exhaust gases through the pipe 6.

Figure 11:
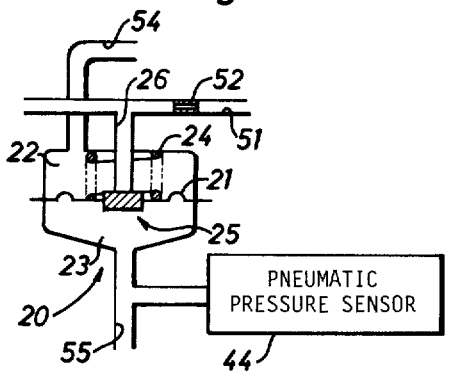
FIGS. 11 to 15 illustrate partial modifications of the exhaust gas recirculation system respectively.

Although in the above embodiment the pneumatic pressure sensor 44 is provided on the pneumatic chamber 22 of pressure regulator 20, it may be, as shown in FIG. 11, provided on the conduit 55 to detect exhaust pressure Ps applied to the exhaust chamber 23 from the space 9.

Figure 12:
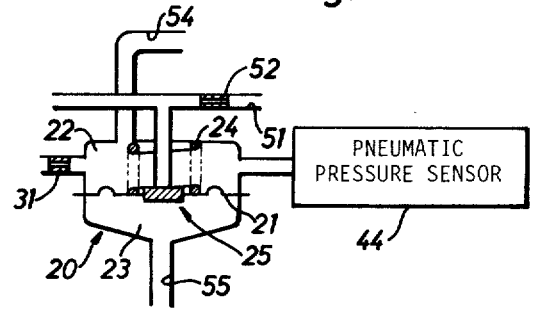

While in the above embodiment the orifice 31 is disposed within the branch conduit 57b, it may be provided within a conduit extended from the pneumatic chamber 22 of pressure regulator 20, as shown in FIG. 12.

Figure 13:
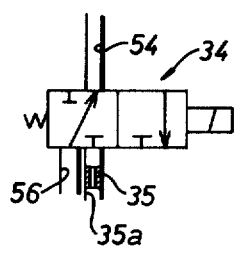

FIG. 13 illustrates a partial modification of the electrically pneumatic control mechanism 30 in the previous embodiment. In the figure, an electrically operated valve 34 is provided in replacement of the first valve 32 of the above embodiment, the second valve 33 and branch conduit 57a being eliminated. The valve 34 is connected at its inlet port to the pneumatic chamber 22 of pressure regulator 20 through the conduit 54. The valve 34 is connected at its first outlet port to the intake manifold 4 through the conduit 56. A second outlet port of valve 34 is also connected to the atmosphere through a conduit 35a. An orifice 35 is disposed within the conduit 35a in replacement of the orifice 31 of the above embodiment.

Figure 14:
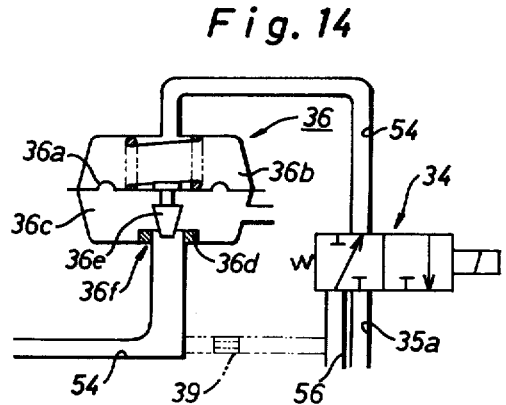

In this case, a servomotor 36 may be provided within the conduit 54 in replacement of the orifice 35, as shown in FIG. 14. The servomotor 36 includes a spring-loaded flexible diagram 36a which is provided within a housing to subdivide the interior of the housing into a pair of chambers 36b, 36c. The chamber 36b is connected to the valve 34 through a portion of the conduit 54. The chamber 36c is opened into the atmosphere and connected to the pressure regulator 20 through a control valve 36f and another portion of the conduit 54. The control valve 36f has a valve seat 36d which is cooperable with a valve body 36e to control the quantity of air flowing therethrough into another portion of the conduit 54 in accordance with pressure applied from the valve 34 into the chamber 36b. In addition, an orifice 39 may be disposed within a conduit connecting the conduit 56 to another portion of the conduit 54, as shown by dot-dash lines in FIG. 14. With the orifice 39, negative pressure from the intake manifold 4 applied into the conduit 56 is throttled and led into the pneumatic chamber 22 of regulator 20 through another portion of conduit 54.

Figure 15:
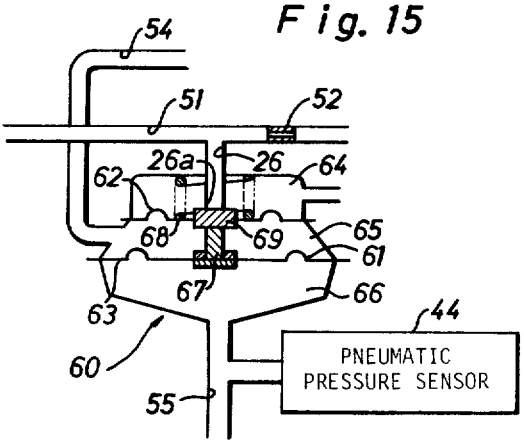

FIG. 15 illustrates a modification of the pressure regulator 20 which comprises a pair of flexible diaphragms 62, 63 assembled within a housing to subdivide the interior of the housing into upper, intermediate and lower chambers 64, 65 and 66. The diaphragm 62 is coupled integrally with the diaphragm 63 by way of a connecting member 67, the pressure receiving surface of diaphragm 62 being smaller than that of diaphragm 63. The upper chamber 64 is opened into the atmosphere, the intermediate chamber 65 is connected to the conduit 54 for the first electrically operated valve 32, and the lower chamber 66 is connected to the space 9 through the conduit 55. A compression spring 68 is disposed within the upper chamber 64 to bias the diaphragm 62 toward the intermediate chamber 65. In the modification, a regulator valve is provided within the upper chamber 64 and has a valve body 69 cooperably with the open end of branch conduit 26. The valve seat 69 is secured to a central portion of diaphragm 62. With the modification, the regulator valve regulates negative pressure applied to the servomotor 10 through the conduit 51 in accordance with pneumatic and exhaust pressure respectively appearing in the chambers 65, 66. In addition, the program of computer 40c of the previous embodiment should be slightly modified to be adapted to each modification of FIGS. 11 to 15.

For practice of the present invention, it is possible that the same function as that of the drive circuit 40g may be substantially performed in the digital computer 40c to eliminate the drive circuit 40g.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An exhaust gas recirculation system for an internal combustion engine having an induction passage for conducting air-fuel mixture into a combustion chamber of said engine, an exhaust passage for discharging exhaust gases from the combustion chamber, and a recirculation passage leading said exhaust passage to said induction passage to recirculate exhaust gases into the combustion chamber of said engine therethrough, said system comprising:

a pneumatically operated servomotor to be operated by negative pressure applied thereto from said induction passage;

flow control means disposed within said recirculation passage and associated with said servomotor for controlling the flow quantity of exhaust gases through said recirculation passage in accordance with changes of the negative pressure applied to said servomotor;

throttle means disposed within said recirculation passage upstream of said flow control means to form a space between said flow control means and said throttle means;

pressure responsive means for modulating negative pressure applied to said servomotor in response to pneumatic pressure applied thereto and pressure appearing in said space;

first means for producing a first electric binary signal indicative of rotational speed of said engine;

second means for producing a second electric binary signal indicative of negative pressure in said induction passage;

third means for producing a first electric analog signal indicative of pneumatic pressure applied to said pressure responsive means;

a digital computer for repetitively calculating a value indicative of optimum pneumatic pressure to be applied to said pressure responsive means in accordance with the first and second binary signals, said computer being programmed to calculate the optimum value from a function describing a desired relationship among optimum pneumatic pressure, rotational speed of said engine and negative pressure in said induction passage;

fourth means for converting a third electric binary signal indicative of the calculated optimum value from said computer into a second electric analog signal;

fifth means for comparing a level of said first analog signal with first and second levels derived from said second analog signal to produce a first output signal therefrom when said first level is higher than the level of said first analog signal and to produce a second output signal therefrom when said second level is lower than the level of said first analog signal, said fifth means ceasing the output signals when the level of said first analog signal is between said first and second levels; and first and second electrically operated valves to selectively apply negative pressure and the atmospheric pressure respectively from said induction passage and the exterior to said pressure responsive means when energized in response to one of said first and second output signals from said fifth means.

2. An exhaust gas recirculation system as claimed in claim 1, wherein said fifth means comprises:

a first comparator for comparing a level of said first analog signal with a first divided voltage derived from said second analog signal to produce a first output signal therefrom when said first divided voltage is higher than the level of said first analog signal, and a second comparator for comparing the level of said first analog signal with a second divided voltage derived from said second analog signal to produce a second output signal therefrom when said second divided voltage is lower than the level of said first analog signal, said first and second comparators ceasing said first and second output signals respectively when the level of said first analog signal is between said first and second divided voltages.

3. An exhaust gas recirculation system as claimed in claim 1, wherein said first electrically operated valve is disposed within a conduit connecting said pressure responsive means to said induction passage, and said second electrically operated valve is disposed within a branch conduit extended from a portion of said first-named conduit to the exterior between said pressure responsive means and said first electrically operated valve.

4. An exhaust gas recirculation system as claimed in claim 3, further comprising an orifice disposed within a second branch conduit extended from a portion of said first-named conduit to the exterior between said pressure responsive means and said first electrically operated valve, said orifice throttling the flow quantity of the air flowing into said first-named conduit.

5. An exhaust gas recirculation system for an internal combustion engine having an induction passage for conducting air-fuel mixture into a combustion chamber of said engine, an exhaust passage for discharging exhaust gases from the combustion chamber, and a recirculation passage leading said exhaust passage to said induction passage to recirculate exhaust gases into the combustion chamber of said engine therethrough, said system comprising:

a pneumatically operated servomotor to be operated by negative pressure applied thereto from said induction passage;

flow control means disposed within said recirculation passage and associated with said servomotor for controlling the flow quantity of exhaust gases through said recirculation passage in accordance with changes of the negative pressure applied to said servomotor;

throttle means disposed within said recirculation passage upstream of said flow control means to form a space between said flow control means and said throttle means;

pressure responsive means for mdoulating negative pressure applied to said servomotor in response to pneumatic pressure applied thereto and pressure appearing in said space;

first means for producing a first electric binary signal indicative of rotational speed of said engine;

second means for producing a second electric binary signal indicative of negative pressure in said induction passage;

third means for producing a first electric analog signal indicative of the pressure in said space;

a digital computer for repetitively calculating a value indicative of optimum pneumatic pressure to be applied to said pressure responsive means in accordance with the first and second binary signals, said computer being programmed to calculate the optimum value from a function describing a desired relationship among optimum pneumatic pressure, rotational speed of said engine and negative pressure in said induction passage;

fourth means for converting a third electric binary signal indicative of the calculated optimum value from said computer into a second electric analog signal;

fifth means for comparing a level of said first analog signal with first and second levels derived from said second analog signal to produce a first output signal therefrom when said first level is higher than the level of said first analog signal and to produce a second output signal therefrom when said second level is lower than the level of said first analog signal, said fifth means ceasing the output signals when the level of said first analog signal is between said first and second levels; and first and second electrically operated valves to selectively apply negative pressure and the atmospheric pressure respectively from said induction passage and the exterior to said pressure responsive means when energized in response to one of said first and second output signals from said fifth means.

* * * * *